(12) United States Patent
Bansal et al.

(10) Patent No.: US 10,572,351 B1
(45) Date of Patent: Feb. 25, 2020

(54) SYSTEM AND METHOD FOR DATA-LESS BACKUPS MODIFICATION DURING CHECKPOINT MERGING

(71) Applicant: EMC IP Holding Company LLC, Hopkinton, MA (US)

(72) Inventors: Aaditya Rakesh Bansal, Bangalore (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 16/161,889

(22) Filed: Oct. 16, 2018

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1451* (2013.01); *G06F 11/1456* (2013.01); *G06F 2009/45595* (2013.01); *G06F 2201/82* (2013.01)

(58) Field of Classification Search
None
See application file for complete search history.

(56) References Cited

U.S. PATENT DOCUMENTS

| | | | |
|---|---|---|---|
| 8,954,789 B2 * | 2/2015 | Rangachari | G06F 3/065 711/159 |
| 9,971,525 B2 * | 5/2018 | Litke | G06F 3/0619 |
| 2019/0179918 A1 * | 6/2019 | Singh | G06F 11/1448 |

* cited by examiner

*Primary Examiner* — Brian R Peugh
(74) *Attorney, Agent, or Firm* — Chamberlain, Hrdlicka, White, Williams & Aughtry

(57) ABSTRACT

A production host includes a persistent storage for storing backup policies and a production agent that obtains a backup generation request for a virtual machine of the virtual machines; in response to the backup generation request, performs a continuity chain verification of a continuity chain associated with the virtual machine to identify a continuity state of backups associated with the virtual machine; makes a first determination, based on the continuity state of the backups associated with the virtual machine, that the backups associated with the virtual machine are in a remediable state; and, in response to the first determination, performs a remediation of the continuity chain to change the backups associated with the virtual machine to be in a continuous state; and generates a backup of the virtual machine using the backup policies while the continuity state of the backups associated with the virtual machine are in the continuous state.

20 Claims, 12 Drawing Sheets

SYSTEM AND METHOD FOR DATA-LESS BACKUPS MODIFICATION DURING CHECKPOINT MERGING

BACKGROUND

Computing devices may include any number of internal components such as processors, memory, and persistent storage. Each of the internal components of a computing device may be used to generate data. The process of generating and storing data may utilize computing resources of the computing device such as processing and storage. Utilization of computing resources may impact the overall performance of the computing devices.

In some cases, multiple computing devices may operate cooperatively as a distributed system. Each of the computing devices of the distributed may perform different or similar functions while cooperating with other computing devices to accomplish shared goals.

SUMMARY

In one aspect, a production host that hosts virtual machines in accordance with one or more embodiments of the invention includes a persistent storage and a production agent. The persistent storage stores backup policies. The production agent obtains a backup generation request for a virtual machine of the virtual machines; in response to the backup generation request, performs a continuity chain verification of a continuity chain associated with the virtual machine to identify a continuity state of backups associated with the virtual machine; makes a first determination, based on the continuity state of the backups associated with the virtual machine, that the backups associated with the virtual machine are in a remediable state; and, in response to the first determination, performs a remediation of the continuity chain to change the backups associated with the virtual machine to be in a continuous state; and generates a backup of the virtual machine using the backup policies while the continuity state of the backups associated with the virtual machine are in the continuous state.

In one aspect, a method for performing a backup of a virtual machine in accordance with one or more embodiments of the invention includes obtaining a backup generation request for the virtual machine; in response to the backup generation request, performing a continuity chain verification of a continuity chain associated with the virtual machine to identify a continuity state of backups associated with the virtual machine; making a first determination, based on the continuity state of the backups associated with the virtual machine, that the backups associated with the virtual machine are in a remediable state; and, in response to the first determination, performing a remediation of the continuity chain to change the backups associated with the virtual machine are to be in a continuous state; and generating a backup of the virtual machine using backup policies of a production host hosting the virtual machine while the continuity state of the backups associated with the virtual machine are in the continuous state.

In one aspect, a non-transitory computer readable medium in accordance with one or more embodiments of the invention includes computer readable program code, which when executed by a computer processor enables the computer processor to perform a method for performing a backup of a virtual machine. The method includes obtaining a backup generation request for the virtual machine; in response to the backup generation request, performing a continuity chain verification of a continuity chain associated with the virtual machine to identify a continuity state of backups associated with the virtual machine; making a first determination, based on the continuity state of the backups associated with the virtual machine, that the backups associated with the virtual machine are in a remediable state; and, in response to the first determination, performing a remediation of the continuity chain to change the backups associated with the virtual machine are to be in a continuous state; and generating a backup of the virtual machine using backup policies of a production host hosting the virtual machine while the continuity state of the backups associated with the virtual machine are in the continuous state.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing backup services in a distributed environment. The backup services may include, for example, generation of backups and storage of the generated backups in backup storage.

In one or more embodiments of the invention, the system performs an analysis of previously stored backups before generating and storing an additional backup. For example, the system may attempt to identify whether the previously stored backups are still useful restoration purposes. If a backup is not useful restoration purposes, the system may automatically consolidate the backup with other backups before generating the additional backup. By consolidating the backup, storage resources are conserved. Additionally, by consolidating the backup, reduce size backup may be generated during future backup generation sessions. For example, backups that only reflect changes to a portion of the distributed environment may be used rather than backups that reflect the entire state of the portion of the distributed environment at a predetermined point in time.

Figure 1:
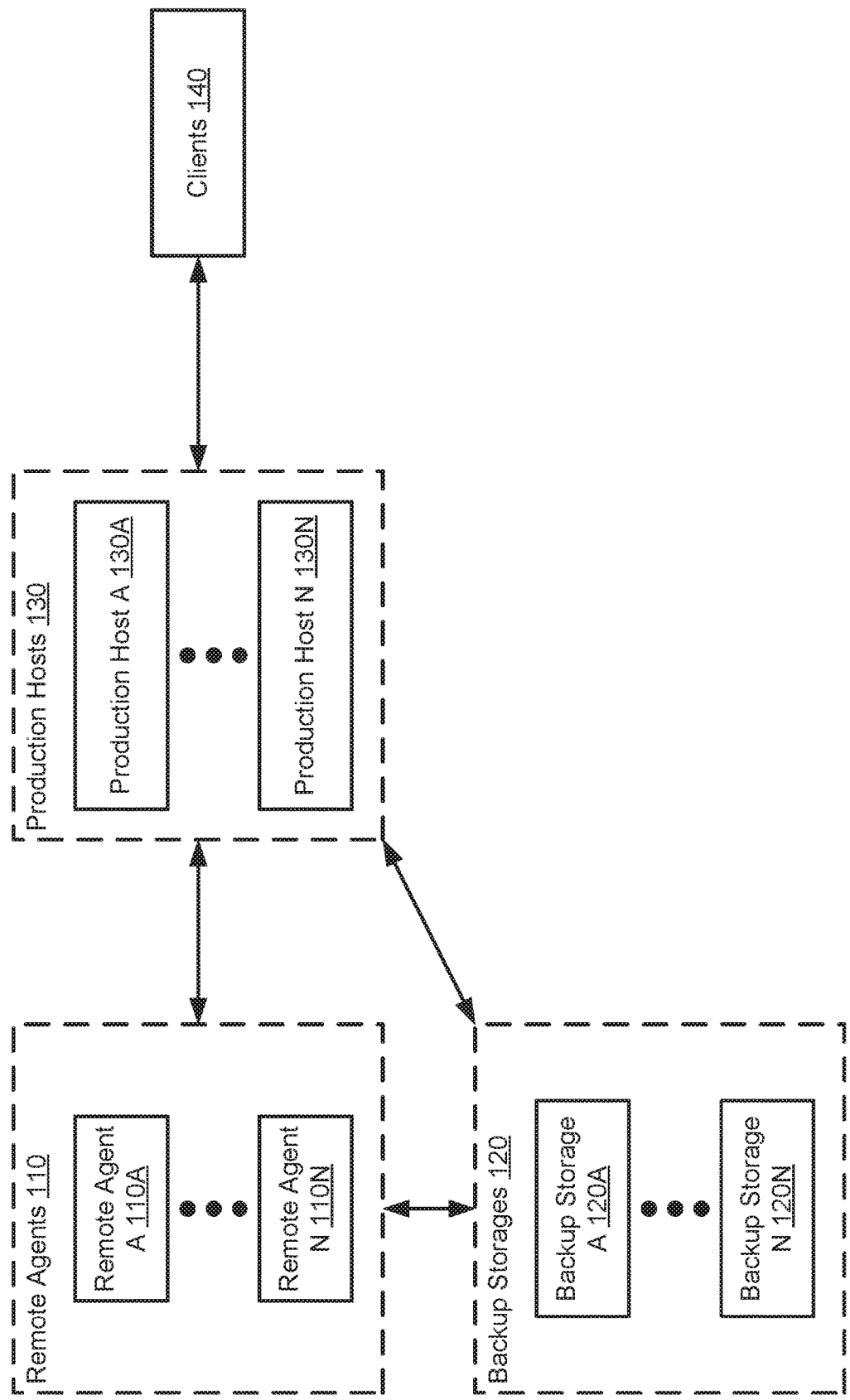
FIG. 1 shows a diagram of a system in accordance with one or more embodiments of the invention.

FIG. 1 shows an example system in accordance with one or more embodiments of the invention. The system may include remote agents (110) that provide backup services to production hosts (130). Backup services may include the generation and storage of backups in backup storages (120) and restoration of the production hosts using previously generated backups that are stored in the backup storages (120).

The production hosts (130) may provide services to the clients (140). For example, the production hosts (130) may host applications that provide application services to the clients (140). By providing application services to the clients (140), data that is relevant to the clients (140) may be stored in the production hosts (130).

Each component of the system of FIG. 1 may be operably connected to each other component and/or additional components (not shown) via any combination of wired and/or wireless connections. Each component of the system is discussed below.

In one or more embodiments of the invention, the remote agents (110) provide backup services to the production hosts (130). The remote agents (110) may provide backup services to the production hosts (130) by orchestrating: (i) generation of backups of the production hosts, (ii) storage of backups of the production hosts (130) in backup storages (120), (ii) modification of the backups in the backup storages (120) in response to changes in the production hosts (130), and (iv) restoration of the production hosts (130) to previous states using backups stored in the backup storages (120).

In one or more embodiments of the invention, the remote agents (110) are implemented as computing devices. A computing device may be, for example, a mobile phone, a tablet computer, a laptop computer, a desktop computer, a server, a distributed computing system, or a cloud resource. The computing device may be other types of computing devices without departing from the invention. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the remote agents (110) described throughout this application and/or all, or a portion, of the methods illustrated in FIGS. 4A-4C. For additional details regarding computing devices, See FIG. 6.

In one or more embodiments of the invention, the remote agents (110) are implemented as logical devices. A logical device may utilize the computing resources of any number of computing devices to provide the functionality of the remote agents (110) described throughout this application and/or all, or a portion, of the methods illustrated in FIGS. 4A-4C.

In one or more embodiments of the invention, the backup storages (120) provide data storage services. For example, the backup storages (120) may store backups of the production hosts (130). Similarly, the backup storages (120) they provide copies of previously stored backups of the production hosts (130).

Additionally, the backup storages (120) include functionality to modify previously stored backups and/or metadata regarding the previously stored backups in response to changes to the production hosts (130). For example, the backup storages (120) may modify previously stored backups when production hosts (130) are no longer interested in maintaining the ability to be able to restore the state of the production hosts (130) to certain predetermined states. By modifying the previously stored backups, or metadata regarding the previously stored backups, the backup storages (120) may enable future backups to be generated that are smaller in size when compared to backups that may be generated without modification of the previously stored backups and/or metadata associated with the previously stored backups. For additional details regarding modification of previously stored backups and/or associated metadata, refer to FIGS. 3A-3B.

In one or more embodiments of the invention, the backup storages (120) are implemented as computing devices. A computing device may be, for example, a mobile phone, a tablet computer, a laptop computer, a desktop computer, a server, a distributed computing system, or a cloud resource. The computing device may be other types of computing devices without departing from the invention. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storages (120) described throughout this application and/or all, or a portion, of the methods illustrated in FIGS. 4A-4C. For additional details regarding computing devices, refer to FIG. 6.

In one or more embodiments of the invention, the backup storages (120) are implemented as logical devices. A logical device may utilize the computing resources of any number of computing devices to provide the functionality of the backup storage (120) described throughout this application. For additional details regarding the backup storages (120), refer to FIG. 2B.

In one or more embodiments of the invention, the production hosts (130) provide services to the clients (140). For example, the production hosts (130) may host any number of applications that provide application services to the clients (140).

In one or more embodiments of the invention, application services may be any type of computer implemented service. For example, application services may be database services, electronic communication services, instant messaging services, file storage services, and/or any other type of service. Each of the production hosts (e.g., 130A, 130N) may provide application services by hosting applications. Each of the production hosts may host any number of applications. Different production hosts may host the same number of applications or different numbers of applications. Different production hosts may host similar applications or different applications.

In one or more embodiments of the invention, the production hosts (130) host virtual machines that host applications. Each of the production hosts may host any number of virtual machines that, in turn, host any number of applications.

In one or more embodiments of the invention, the production hosts (130) are implemented as computing devices. A computing device may be, for example, a mobile phone, a tablet computer, a laptop computer, a desktop computer, a server, a distributed computing system, or a cloud resource. The computing device may be other types of devices without departing from the invention. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functionality of the production hosts (130) described throughout this application and/or all, or a portion, of the methods illustrated in FIGS. 4A-4C. For additional details regarding computing devices, refer to FIG. 6.

In one or more embodiments of the invention, the production hosts (130) are implemented as logical devices. A logical device may utilize the computing resources of any number of computing devices to provide the functionality of the production host (130) described throughout this application and/or all, or a portion, of the methods illustrated in FIGS. 4A-4C. For additional details regarding the production hosts (130), refer to FIG. 2A.

In one or more embodiments of the invention, the clients (140) interact with the production hosts (130). For example, the clients (140) may utilize application services provided by the production hosts (130). When the clients (140) interact with the production hosts (130) data that is relevant to the clients (140) may be stored on the production hosts (130).

For example, consider a scenario in which the production hosts (130) host a database utilized by the clients (140). In this scenario, the database may be a customer database of customers of the clients (140). When a potential new customer is identified, one of the clients may add information regarding the new customer to the database. By doing so, data that is relevant to the clients (140) may be stored in the production hosts (130) because the clients (140) a desire access to the data regarding the new customer at some future point in time.

In one or more embodiments of the invention, the clients (140) include functionality to use services provided by the production hosts (130). For example, the clients (140) may host local applications that interact with applications hosted by the production hosts (130).

In one or more embodiments of the invention, the clients (140) are implemented as computing devices. A computing device may be, for example, a mobile phone, a tablet computer, a laptop computer, a desktop computer, a server, a distributed computing system, or a cloud resource. The computing device may be other types of devices without departing from the invention. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the clients (140) described throughout this application and/or all, or a portion, of the methods illustrated in FIGS. 4A-4C. For additional details regarding computing devices, refer to FIG. 6.

In one or more embodiments of the invention, the clients (140) are implemented as logical devices. A logical device may utilize the computing resources of any number of computing devices to provide the functionality of the clients (140) described throughout this application.

While the system of FIG. 1 has been illustrated as including a limited number of components for the sake of brevity, the system may include additional components (not shown), fewer components, and/or different components (not shown) without departing from the invention.

Figure 2A:
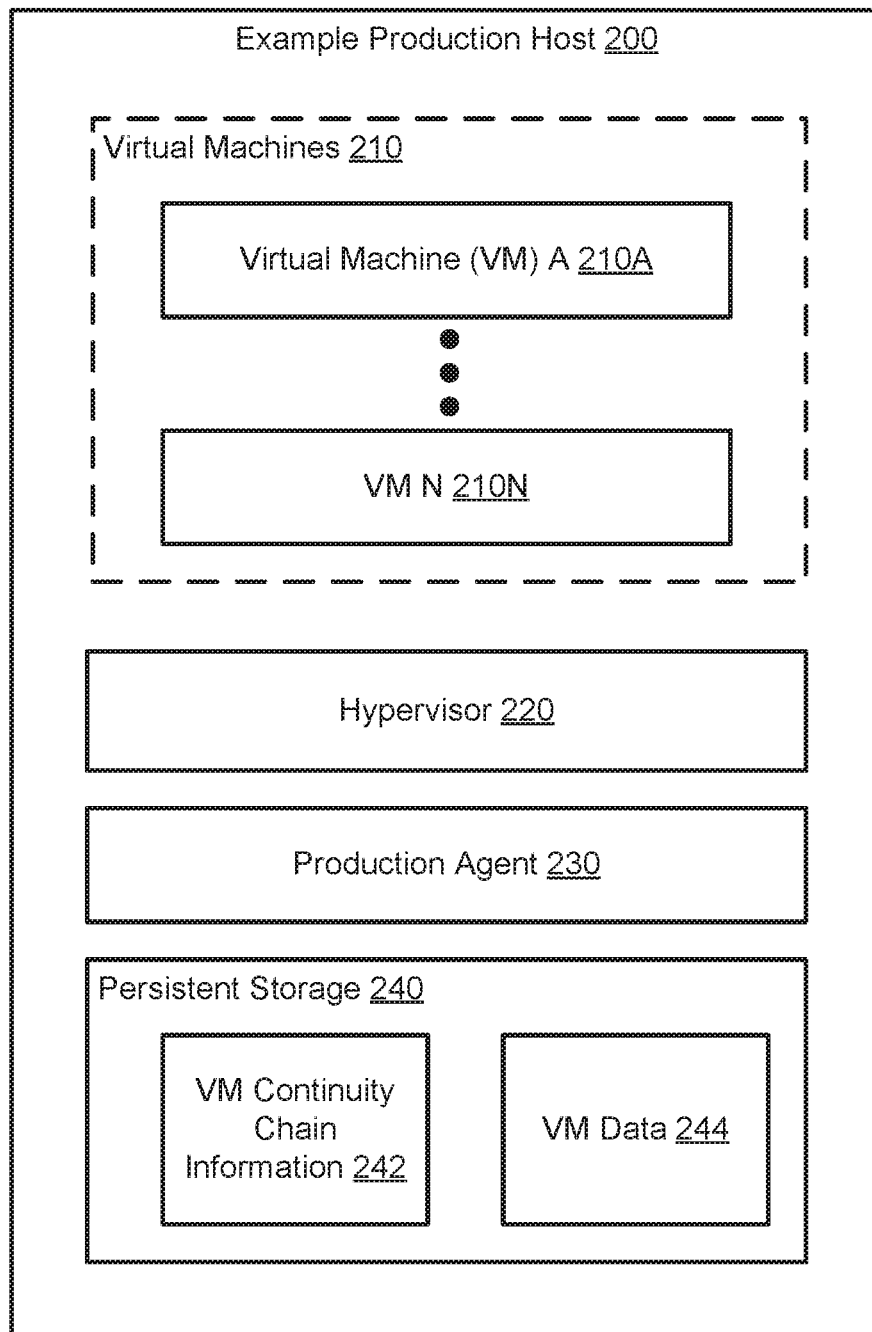
FIG. 2A shows a diagram of an example production host in accordance with one or more embodiments of the invention.

As discussed above, the backup storages may store backups of the production hosts (130). FIG. 2A shows a diagram of an example production host (200) in accordance with one or more embodiments of the invention. The example production host (200) may be similar to a production host (e.g., 130A, 130N) discussed above.

To provide the functionality of the production hosts discussed above, the example production host (200) may include virtual machines (210), hypervisor (220), production agent (230), and persistent storage (240). Each of these components the example production host (200) is discussed below.

In one or more embodiments of the invention, the virtual machines (210) are logical entities executed using computing resources of the example production host (200) and/or other computing devices. Each of the virtual machines (e.g., 210A, 210N) may be performing similar or different processes.

By execution of the virtual machines (210), virtual machine data (244) may be stored in persistent storage (240). In other words, virtual machines (210) and applications hosted by the virtual machines may generate data that is stored in the persistent storage (240). The virtual machine data (244) may reflect the state of a virtual machine.

In one or more embodiments of the invention, the virtual machines (210) provide services to clients (e.g. 140, FIG. 1). For example, the virtual machines (210) may host instances of databases, email servers, and/or other applications. The virtual machines (210) may host other types of applications without departing from the invention. The applications hosted by the virtual machines (210) may provide application services to clients.

Figure 4A:
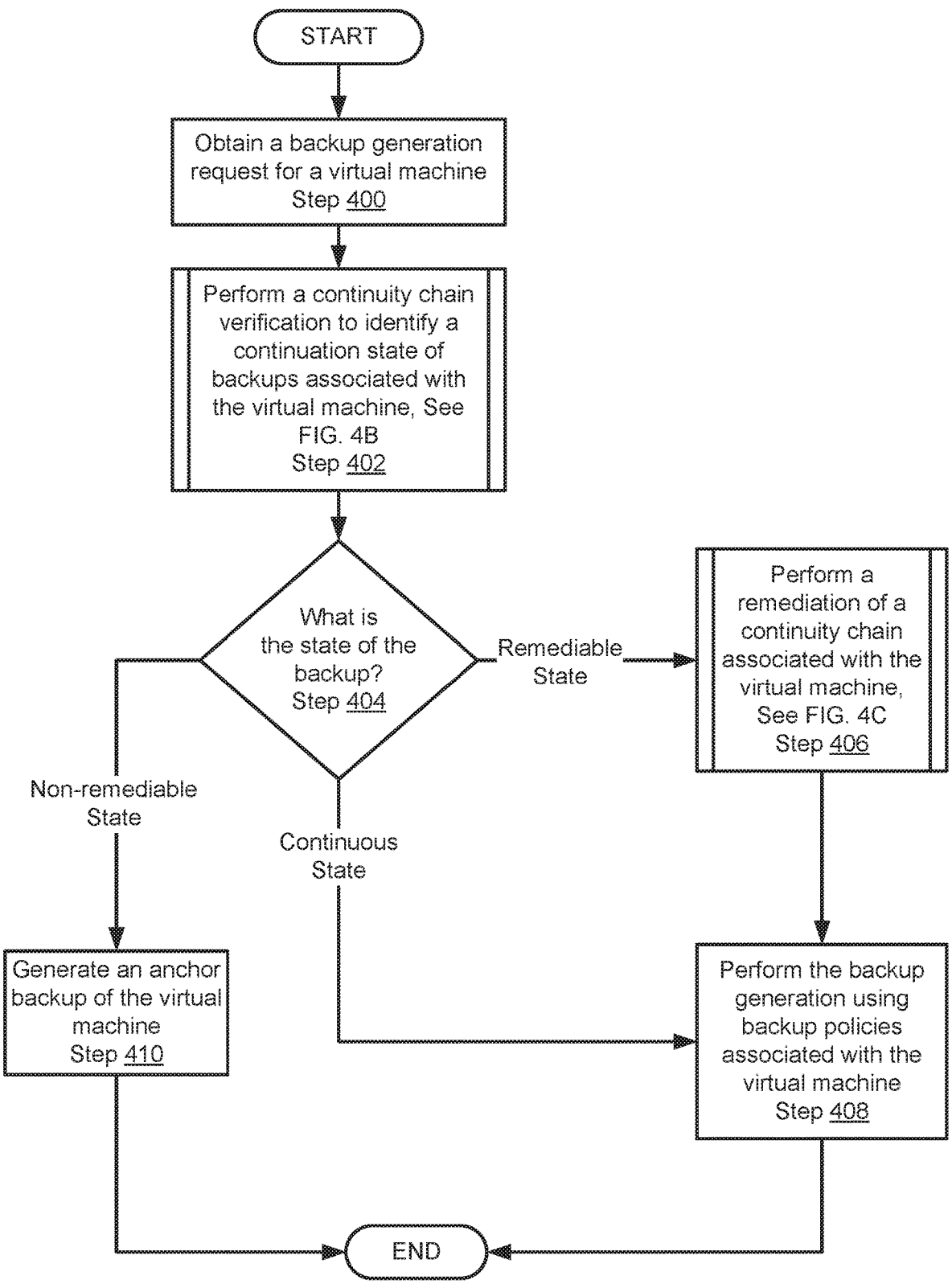
FIG. 4A shows a flowchart of a method of performing a backup of a virtual machine in accordance with one or more embodiments of the invention.
Figure 4B:
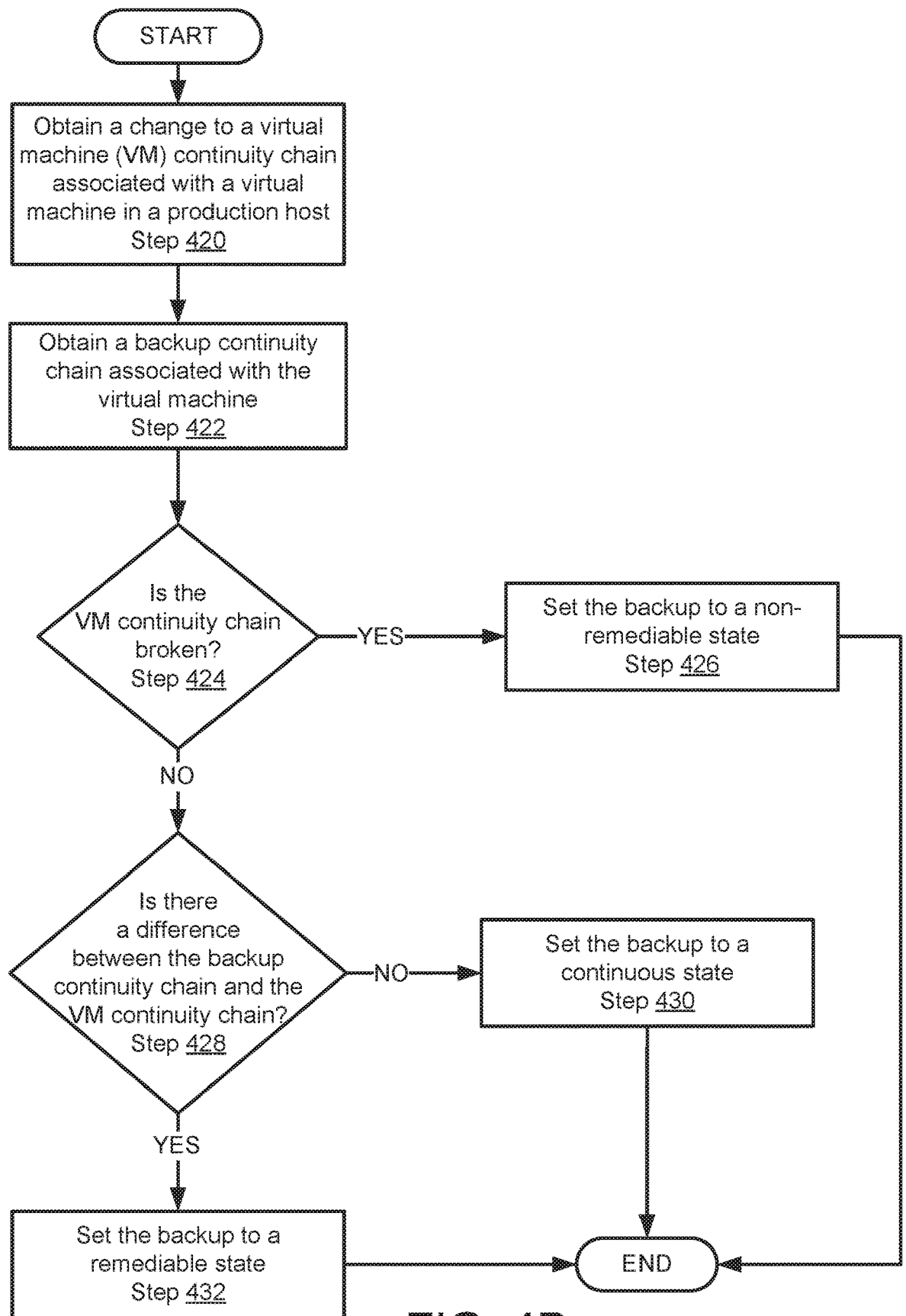
FIG. 4B shows a flowchart of a method of performing a continuity chain verification in accordance with one or more embodiments of the invention.
Figure 4C:
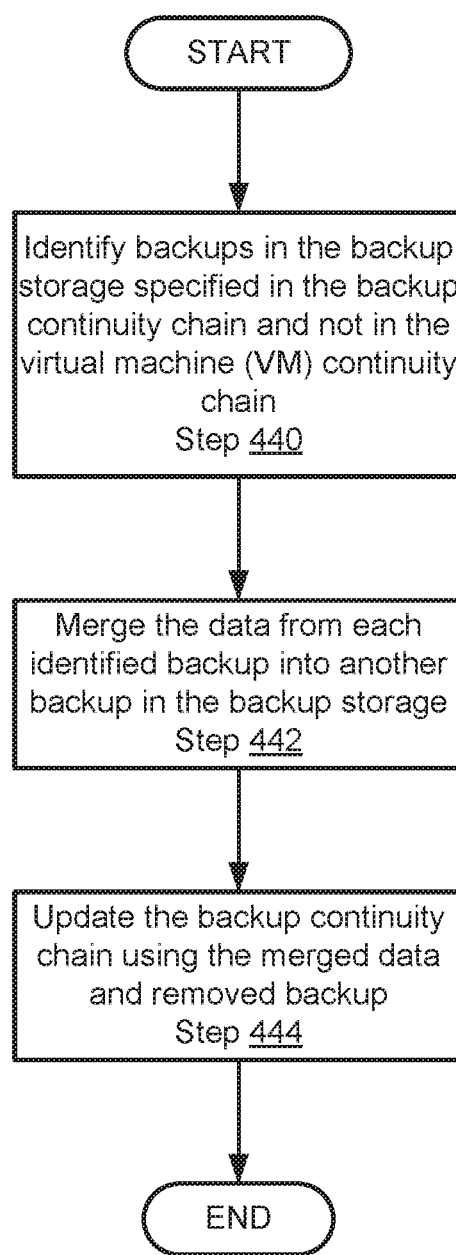
FIG. 4C shows a flowchart of a method of performing a remediation of continuity chains in accordance with one or more embodiments of the invention.

In one or more of embodiments of the invention, the virtual machines (210) are implemented as computer instructions, e.g., computer code, stored on a persistent storage that when executed by a processor of the example production host (200) cause the example production host (200) to provide the functionality of the virtual machines (210) described throughout the application and/or all, or a portion, of the methods illustrated in FIGS. 4A-4C.

In one or more embodiments of the invention, the hypervisor (220) orchestrates the operation of the virtual machines (210). The hypervisor (220) may orchestrate the operation of the virtual machines (210) by allocating computing resources to each of the virtual machines (210).

In one or more embodiments of the invention, the hypervisor (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application and/or all or a portion of the methods illustrated in FIGS. 4A-4C.

In one or more of embodiments of the invention, the hypervisor (220) is implemented as computer instructions, e.g., computer code, stored on a persistent storage that when executed by a processor of the example production host (200) cause the example production host (200) to provide the functionality of the hypervisor (220) described throughout the application and/or all or a portion of the methods illustrated in FIGS. 4A-4C.

In one or more embodiments of the invention, the production agent (230) locally orchestrates the performance of backup services for the virtual machines (210). The production agent (230) may orchestrate the performance of backup services under the direction of remote agents. For example, the remote agents may send instructions to the production agent (230) regarding when backups of the virtual machines (210) should be generated, where the generated backups should be stored, and when a virtual machine should be restored to a previous state.

Two orchestrate the performance of backup services, the production agent (230) may issue commands to the hypervisor (220) to control the operation of the virtual machine (210) when a backup of one of the virtual machines (210) is being generated and/or when a restoration of one of the virtual machines (210) is to be performed.

In one or more embodiments of the invention, the production agent (230) stores metadata regarding backups that have been previously generated. The production agent (230) may store the metadata as virtual machine continuity chain information (242) and the persistent storage (240). The virtual machine continuity chain information (242) may specify the type of each previously generated backup and/or the relationship between each backup those previously generated.

In some cases, a previously generated backup and no longer be useful. For example, each previously generated backup may be usable to restore a virtual machine to a previous state. However, under some circumstances it may no longer be desirable to restore a virtual machine to a previous state associated with the backup. In such a scenario, it may no longer be advantageous to continue to store the backup.

In one or more embodiments of the invention, the production agent (230) includes functionality to modify the virtual machine continuity chain information (242). The production agent (230) may modify the virtual machine continuity chain information (242) when it is no longer desirable to continue to maintain functionality to restore a virtual machine to previous state associated with a previously generated backup. The production agent (230) may be notified of such changes from other entities such as, for example, clients or remote agents. The production agent (230) may be notified of such changes from other entities without departing from the invention.

In one or more embodiments of the invention, the production agent (230) sends a notification of the modification of the virtual machine continuity chain information (242) to a backup storage storing the backup that is no longer desirable. The notification may include information regarding the modification. As will be discussed in greater detail below, a backup storage may take action in response to such modifications to maintain consistency of the backups and backup storage using virtual machine continuity chain information (242).

In one or more embodiments of the invention, the production agent (230) uses the virtual machine continuity chain information (242) to manage the virtual machine data (244) when a backup of one of the virtual machines (210) is requested. The production agent (230) may use the virtual machine continuity chain information (242) when specifying a type of backup to be generated and/or identifying whether any remediation is to be performed prior to generating the backup.

In one or more embodiments of the invention, the production agent (230) is a hardened entity, i.e., not modifiable by an entity that is remote to the example production host (200) on which the production agent (230) is executing. The production agent (230) may have a set, finite number of predefined functions that may be invoked by a remote entity. In one or more embodiments of the invention, the production agent (230) is not configurable by modifying settings or associated configuration files by a remote entity.

In one or more embodiments of the invention, the production agent (230) is implemented as computer instructions, e.g., computer code, stored on a persistent storage that when executed by a processor of the example production host (200) cause the example production host (200) to provide the functionality of the production agent (230) described throughout the application and/or all or a portion of the methods illustrated in FIGS. 4A-4C.

In one or more embodiments of the invention, the production agent (230) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (230) described throughout this application and/or all or a portion of the methods illustrated in FIGS. 4A-4C.

As discussed above, the persistent storage (240) of the example production host (200) may include the virtual machine continuity chain information (242) and the virtual machine data (244). The persistent storage (240) may include additional, fewer, and/or different data structures without departing from the invention. Each of the aforementioned data structures is discussed below.

In one or more embodiments of the invention, the virtual machine continuity chain information (242) is a data structure that includes information regarding the types of previously generated backups and relationships between the previously generated backups of each of the virtual machines (210). For additional details regarding the virtual machine continuity chain information (242), refer to FIG. 3A.

In one or more embodiments of the invention, the virtual machine data includes the data generated and/or used by the virtual machines (210). The virtual machine data (244) may be disks that are used to read from and/or write to by the virtual machines (210). The virtual machine data (244) may be used when generating a backup of a virtual machine.

Figure 2B:
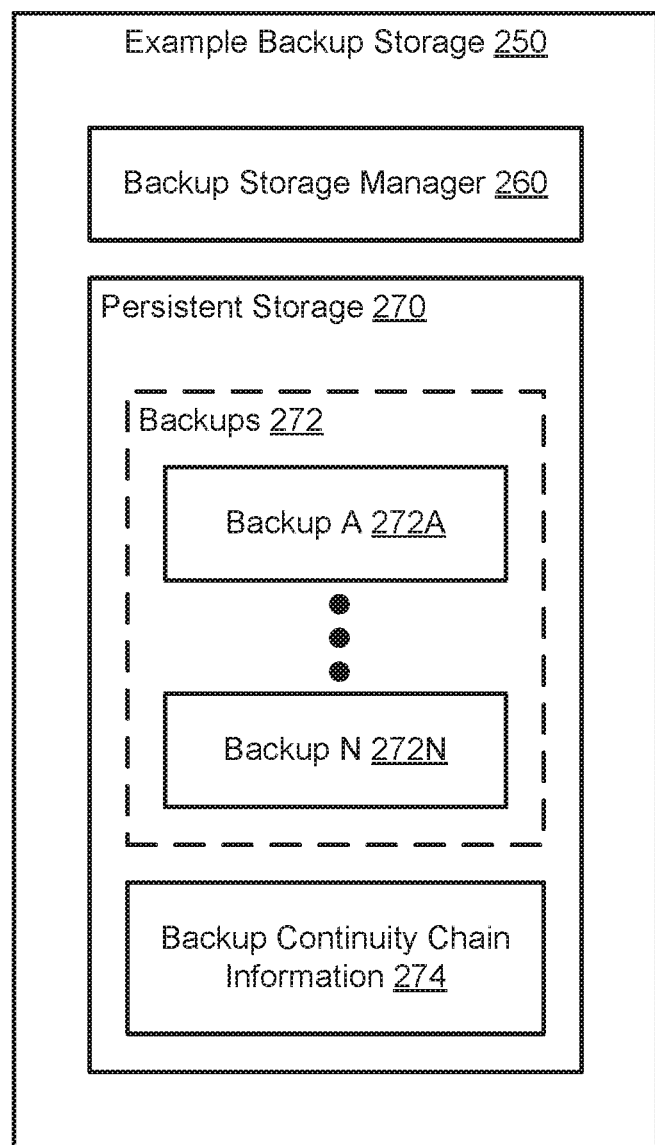
FIG. 2B shows a diagram of an example backup storage in accordance with one or more embodiments of the invention.

As discussed above, backups of the production hosts may be stored in backup storage. FIG. 2B shows a diagram of an example backup storage (250) in accordance with one or more embodiments of the invention. The example backup storage (250) may be similar to backup storages (120, FIG. 1) discussed above. As discussed above, the example backup storage (250) may provide data storage services. To provide data storage services, the example backup storage (250) may include a backup storage manager (260) that manages storage of data in a persistent storage (270). Each component of the example backup storage (250) is discussed below.

In one or more embodiments of the invention, the backup storage manager (260) manages data stored in the persistent storage (270). For example, the backup storage manager (260) may store backups for the production hosts, provide previously stored backups of the production hosts, modify previously stored backups of the production hosts, delete previously stored backups of the production hosts, and/or modify metadata associated with the previously stored backups of the production hosts.

In one or more embodiments of the invention, the metadata is backup continuity chain information (274). The backup continuity chain information (274) may generally mirror virtual machine continuity chain information (242, FIG. 2A).

In one or more embodiments of the invention, the backup storage manager (260) maintains consistency between the backup continuity chain information (274) and the virtual machine continuity chain information (242, FIG. 2A). To do so, the backup storage manager (260) may automatically modify a portion of the backups (272) in response to notifications of changes to the virtual machine continuity chain information (242, FIG. 2A).

For example, when a notification indicates that a backup is no longer desirable, the backup storage manager (260) may take action to remove the backup and modify the backup continuity chain information (274) to reflect removal of the backup. The backup storage manager (260) may do so by merging the no longer desirable backup with another backup.

The persistent storage (270) of the example backup storage (250) may include backups (272) and/or backup continuity chain information (274). The persistent storage may include additional, fewer, and/or different data structures without departing from the invention. Each of the aforementioned data structures is discussed below.

In one or more embodiments of the invention, the backups (272) are copies of data generated by virtual machines. The backups (272) include any number of individual backups (e.g., 272A, 272N). Each backup (e.g., 272A, 272N) may be used, either alone or in combination, to restore a virtual machine to a predetermined state.

In one or more embodiments of the invention, the backup continuity chain information (274) is a data structure that includes information about continuity chains of the backups (272). The continuity chain information may specify interdependencies between the backups (272). For additional details regarding the backup continuity chain information, refer to FIG. 3B.

Figure 3A:
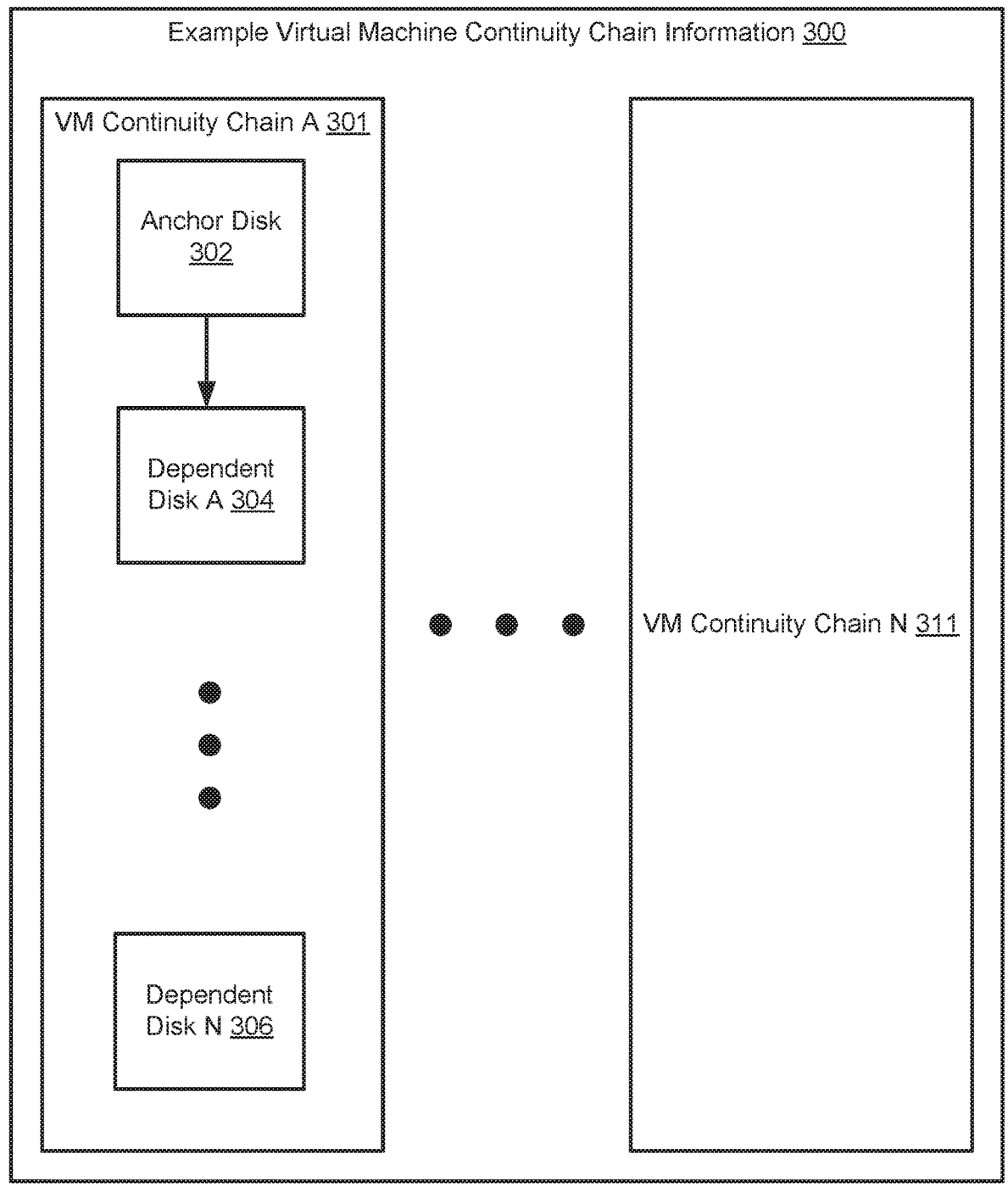
FIG. 3A shows a diagram of example virtual machine continuity chain information in accordance with one or more embodiments of the invention.
Figure 3B:
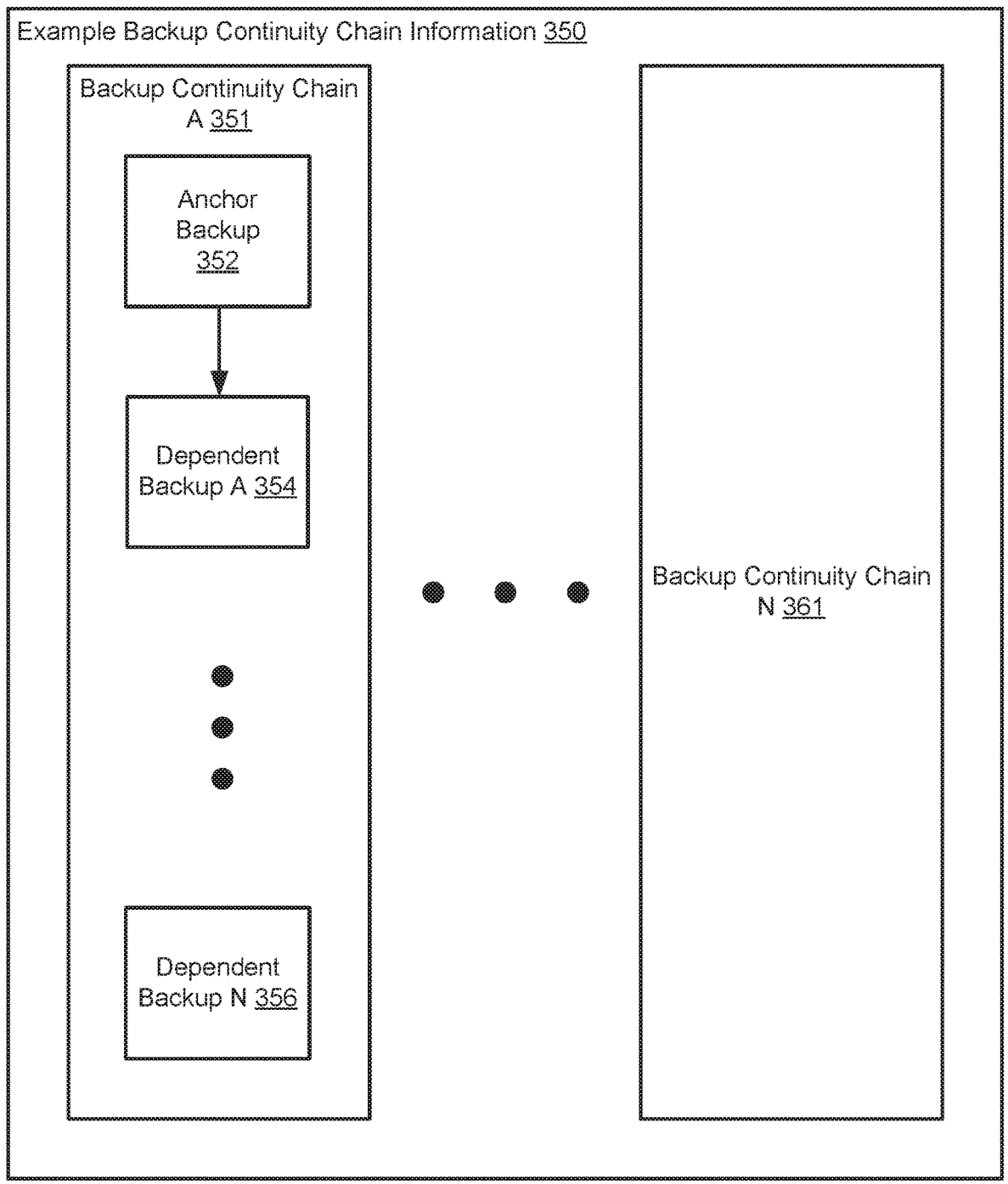
FIG. 3B shows a diagram of example backup continuity chain information in accordance with one or more embodiments of the invention.

To further clarify aspects of virtual machine data and backup continuity chain information, examples of such data structures are illustrated in FIGS. 3A and 3B, respectively.

FIG. 3A shows a diagram of example virtual machine continuity chain information (300) in accordance with one or more embodiments of the invention. The example virtual machine continuity chain information may be similar to the virtual machine continuity chain information (242, FIG. 2A) discussed above. As discussed above, the example virtual machine continuity chain information (300) may be a data structure that specifies portions of data of virtual machines at predetermined points in time and the interdependencies of the portions of data.

The example virtual machine continuity chain information (300) may include one or more virtual machine continuity chains (e.g., 301, 311). Each virtual machine continuity chain may be associated with a virtual machine. A virtual machine continuity chain (301, 311) may specify an anchor disk (302), a dependent disk (304) dependent of the anchor disk (302), and any number of additional dependent disks (e.g., 306) dependent on other dependent disk (304, 306).

In one or more embodiments of the invention, a first disk is dependent on a second disk when the second disk is needed to restore a virtual machine to a state specified by the first disk. An anchor disk (302) may be independent and, therefore, may not require additional disks to restore the virtual machine to a predetermined state specified by the anchor disk (302).

For example, the first disk they represent the state of a virtual machine at a point in time. In contrast, the second disk they represent changes to the state of a virtual machine over predetermined period of time. Thus, the second disk may only be usable in combination with another desk that specifies the state of virtual machine at a point in time.

More specifically, by way of example with respect to FIG. 3A, an entity associated with continuity chain A (301) may be restored to a state associated with the anchor disk (302), an independent disk, without using any of the dependent disks (304, 306). In contrast, to restore the virtual machine associated with continuity chain A (301) to a second state associated with dependent disk A (304), a dependent disk, the anchor disk (302) and dependent disk A (304) must both be used. Further, to restore the associated virtual machine to a third state associated with dependent disk N (306), the anchor disk (302), dependent disk A (304), the dependent disk N (306), and all intervening backups must be used.

In one or more embodiments of the invention, a virtual machine continuity chain (301, 311) is updated according to virtual machine data associated with the virtual machine continuity chain (301, 311). For example, a disk may be merged to another disk in the virtual machine data of a production host. The production host may modify the virtual machine continuity chain (301, 311) associated with the merged disks to reflect the merge. The update may include removing a dependent disk (e.g., 304, 306) associated with a disk that was merged and having a dependent disk (e.g., 304, 306) that depended on the removed dependent disk (e.g., 304, 306) be dependent on the dependent disk (e.g., 304, 306) to which the removed dependent disk (e.g., 304, 306) was merged.

FIG. 3B shows a diagram of example backup continuity chain information (350) in accordance with one or more embodiments of the invention. The example backup continuity chain information may be similar to the backup continuity chain information (274, FIG. 2B) discussed above. As discussed above, the example backup continuity chain information (350) may be a data structure that specifies copies of portions of data of virtual machines at predetermined points in time, and the interdependencies of the copies of portions of data.

The example backup continuity chain information (350) may include one or more backup continuity chains (e.g.,

351, 361). Each backup continuity chain may be associated with a virtual machine. A backup continuity chain (e.g., 351, 361) may specify an anchor backup (352), a dependent backup (354) dependent of the anchor backup (352), and any number of additional dependent backups (356) dependent on other dependent backups (354, 356).

In one or more embodiments of the invention, a backup continuity chain (e.g., 351, 361) is updated according to backups associated with the backup continuity chain (e.g., 351, 361). For example, a backup in a backup storage storing the backup continuity chain information (350) may be merged to another backup. The backup storage may modify the backup continuity chain (e.g., 351, 361) associated with the merged backups to reflect the merge. The update may include removing a dependent backup (354, 356) associated with a backup that was merged and having a dependent backup (e.g., 354, 356) that depended on the removed dependent backup (e.g., 354, 356) be dependent on the dependent backup (e.g., 354, 356) to which the removed dependent backup (e.g., 354, 356) was merged.

While the various steps in the following flowcharts are presented and described sequentially, one of ordinary skill in the relevant art will appreciate that some or all of the steps in any of FIGS. 4A-4C may be executed in a different order, may be combined or omitted, and some or all steps in any of FIGS. 4A-4C may be executed in parallel.

As discussed above, a production host may perform methods for generating a backup. FIG. 4A shows a flowchart of a method in accordance with one or more embodiments of the invention. The method depicted in FIG. 4A may be used to perform a backup of a virtual machine in accordance with one or more embodiments of the invention. The method shown in FIG. 4A may be performed by, for example, production hosts (130, FIG. 1). Other components of the system illustrated in FIG. 1 may perform the method of FIG. 4A without departing from the invention.

In Step 400, a backup generation request for a virtual machine is obtained.

In one or more embodiments of the invention, the backup generation request is obtained from a remote agent implementing backup policies that specify the backup generation. A remote agent may prompt the production host to generate a backup as specified by the backup policies.

In one or more embodiments of the invention, the backup generation request is obtained from a client prompted by a user. The user may request a backup of a virtual machine to be generated. The user may send the request via a client to the production host.

In Step 402, a continuity chain verification is performed to identify a continuity state of backups associated with the virtual machine.

In one or more embodiments of the invention, the continuity chain verification is performed by identifying virtual machine continuity chains associated with the to-be-generated backup. The virtual machine continuity chain, stored in the production host, may be analyzed to ensure that there are consistent interdependencies between the disks specified by the virtual machine continuity chain. Further, the virtual machine continuity chain may be compared to a backup continuity chain also associated with the to-be-generated backup to identify whether there are any differences between the continuity chains. The differences may be used to identify the continuity state of the backup. For example, if there are no differences between the two continuity chains, the backups may be in a continuous state. Additionally, if there are differences between the continuity chains, the backups may be in a remediable state. Further, the backups may be in a non-remediable state if a continuous chain of backups cannot be formed from existing backups.

In one or more embodiments of the invention, the continuity chain verification is performed via the method illustrated in FIG. 4B. The continuity chain verification may be performed via other methods without departing from the invention.

In Step 404, a state of the backups is determined using the continuation state identified in Step 402. If the backups are in a remediable state, the method may proceed to Step 406. If the backups are in a continued state, the method may proceed to Step 408. If the backups are in a non-remediable state, the method may proceed to Step 410.

In Step 406, a remediation of a continuity chain associated with the virtual machine is performed.

In one or more embodiments of the invention, performing the remediation of the continuity chain changes a continuation state of the backups associated with the virtual machine to a continuous state.

In one or more embodiments of the invention, the backup continuity chain is remediated by merging at least two backups. For example, to dependent backups may be merged to form a single backup. The two dependent backups may be merged by consolidating the changes specified by each of the two backups into a single backup. After consolidation of the changes, relationships between the remaining backups in the continuity chain may be updated to reflect the new consolidated backup.

In one or more embodiments of the invention, the remediation of the continuity chain is performed via the method illustrated in FIG. 4C. The remediation may be performed via other methods without departing from the invention.

In Step 408, the backup generation is performed using backup policies associated with the virtual machine.

In one or more embodiments of the invention, the backup policies specify that a dependent backup be generated. The dependent backup generated may be associated with backups specified by the virtual machine continuity chain. For example, the dependent backup generated may depend on another dependent backup of the virtual machine continuity chain.

In one or more embodiments of the invention, generating the backup adds the backup to the continuity chain associated with the virtual machine.

In one or more embodiments of the invention, the generated backup is a dependent backup. By doing so, embodiments of the invention may improve the efficiency of backup generation distributed system by reducing the quantity of data transmitted across a distributed system for backup purposes when compared to contemporary backup technology. Specifically, contemporary backup technology may only be capable of generating an anchor backup when continuity chain is in a remediable state. As discussed above, an anchor backup to be substantially larger in size when compared to a dependent backup because anchor backup reflects the entire state of virtual machine at a predetermined point in time. In contrast, the dependent backup the only reflect changes to a virtual machine over a predetermined period of time. Thus, dependent backups must be smaller than anchor backups and in many cases are substantially smaller than anchor backups. In one or more embodiments of the invention, an anchor backup is an image of a virtual machine. In one or more embodiments of the invention, a dependent backup is a differencing disk that includes rights to a virtual machine over a predetermined period of time and is associated with an image of a virtual machine in a read-only state.

The method may end following Step 408.

Returning step 404, the method may proceed to step 410 in the state of the backups associated with the virtual machine or in a non-remediable state. In Step 410, an anchor backup of the virtual machine is generated.

In one or more embodiments of the invention, the generated anchor backup is a different type of backup from the backup specified by the backup generation request of step 400. For example, the backup generation request may specify generation of a dependent backup. The anchor backup may be generated in response to the non-remediable continuity state identified in Step 402. The anchor backup may be stored in backup storage after it is generated.

The method may end following Step 410.

As discussed above, a production host may perform a continuity chain verification to identify a state of backups associated with a virtual machine. FIG. 4B shows a flowchart of a method in accordance with one or more embodiments of the invention. The method depicted in FIG. 4B may be used to perform a continuity chain verification in accordance with one or more embodiments of the invention. The method shown in FIG. 4B may be performed by, for example, backup storage (120, FIG. 1). Other components of the system illustrated in FIG. 1 may perform the method of FIG. 4B without departing from the invention.

In Step 420, a change to a virtual machine continuity chain associated with the virtual machine in a production host is obtained.

In one or more embodiments of the invention, the change is obtained by receiving the change from a production agent hosted by the production host. The change may be obtained via other methods without departing from the invention.

In Step 422, a backup continuity chain associated with the virtual machine is obtained.

In one or more embodiments of the invention, the backup continuity chain is identified obtained by identifying a backup continuity chain stored in backup storage that is associated with the virtual machine.

In Step 424, it is determined if the virtual machine continuity chain is broken. If the virtual machine continuity chain is broken, the method may proceed to Step 426. If the virtual machine continuity chain is not broken, the method may proceed to Step 428.

In one or more embodiments of the invention, it is determined whether the virtual machine continuity chain is broken by checking whether each disk specified by the virtual machine continuity chain is stored in the backup storage. A virtual machine continuity chain may be broken if it specifies a backup that does not exist in the backup storage.

In Step 426, the backup is set to a non-remediable state.

The method may end following Step 426.

Returning to Step 428, it is determined if there is a difference between the backup continuity chain and the virtual machine continuity chain. If there is not a difference, the method may proceed to Step 430. If there is a difference, the method may proceed to Step 432.

A difference may be, for example, a backup specified by the backup continuity chain that is not specified by the virtual machine continuity chain. In other words, the virtual machine continuity chain may indicate that it is no longer important to be able to restore the virtual machine to a state associated with the backup that is not specified by the virtual machine continuity chain.

In Step 430, the backup is set to a continuous state. The method may end following Step 430.

In Step 432, the backup is set to a remediable state. The method may end following Step 432.

As discussed above, a production host may remediate a backup continuity chain if it differs from a virtual machine continuity chain. FIG. 4C shows a flowchart of a method in accordance with one or more embodiments of the invention. The method depicted in FIG. 4C may be used to remediate a backup continuity chain in accordance with one or more embodiments of the invention. The method shown in FIG. 4C may be performed by, for example, backup storage (120, FIG. 1). Other components of the system illustrated in FIG. 1 may perform the method of FIG. 4C without departing from the invention.

In Step 440, backups that are specified in the backup continuity chain and not in the virtual machine continuity chain are identified.

In one or more embodiments of the invention, the backups are identified by matching each backup specified by the backup continuity chain to a corresponding disk specified by the virtual machine continuity chain. Any backups that do not correspond to a disk may be identified.

In Step 442, the data from the identified backups are merged into another backup in the backup storage.

In one or more embodiments of the invention, an identified backup depends on the other backup to which data from the identified backup is merged. The other backup may be modified to include data from the merged backup in addition to the previously-included data.

In one or more embodiments of the invention, the data is merged from an identified backup to another backup by writing the data from the identified backup to the other backup. The size of the other backup may be increased to accommodate the additional data merged from the identified backup.

In Step 444, the backup continuity chain is updated using the merged data and removed backup.

In one or more embodiments of the invention, the backup continuity chain is updated by removing each backup that have been merged to another backup and specifying the dependency of a backup to the merged backup to depend on the backup that has obtained the merged data. In other words, the backup continuity chain may reflect the modified backups and interdependencies between the backups.

The method may end following Step 444.

Thus, via the methods illustrated in FIGS. 4A-4C, embodiments of the invention may provide a method of storing backup data in a distributed system that is more efficient in contemporary methods. For example, embodiments of the invention may provide a method for modifying existing data stored in backup storage to facilitate generation of smaller backups during subsequent backup generation sessions. By doing so, embodiments of the invention may provide a more efficient method of providing backup services they consume fewer computing resources than contemporary methods. Thus, one or more embodiments of the invention may provide an improved method for providing backup services in a distributed environment.

Figure 5A:
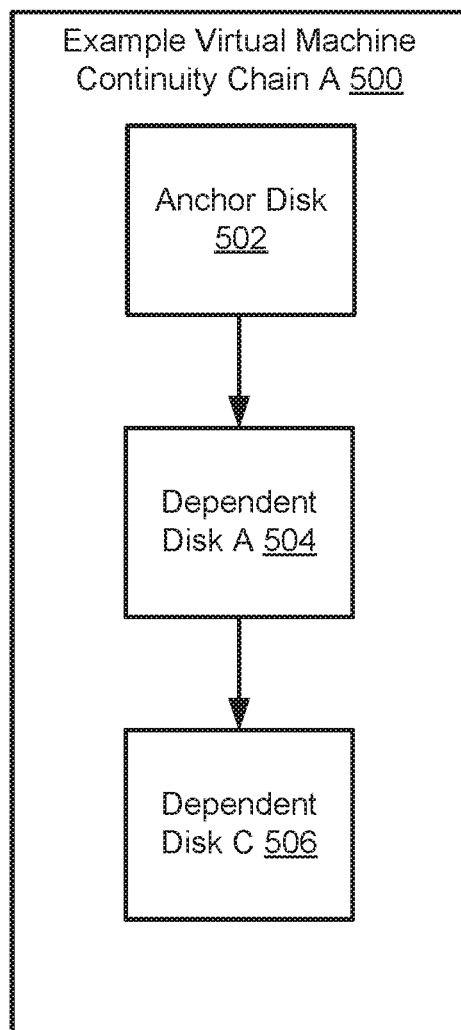
FIG. 5A shows a diagram of an example virtual machine continuity chain.
Figure 5B:
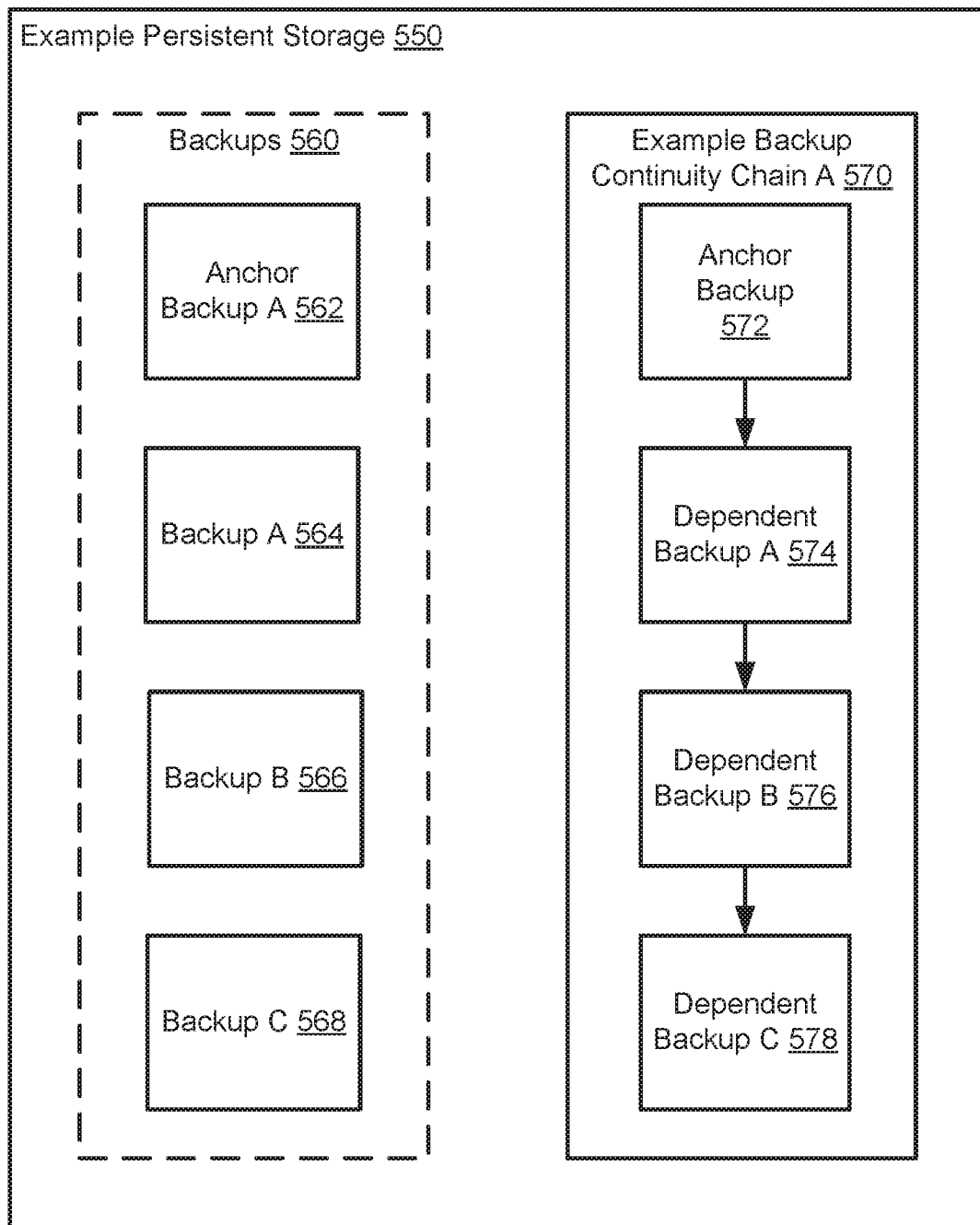
FIG. 5B shows a diagram of an example persistent storage.
Figure 5C:
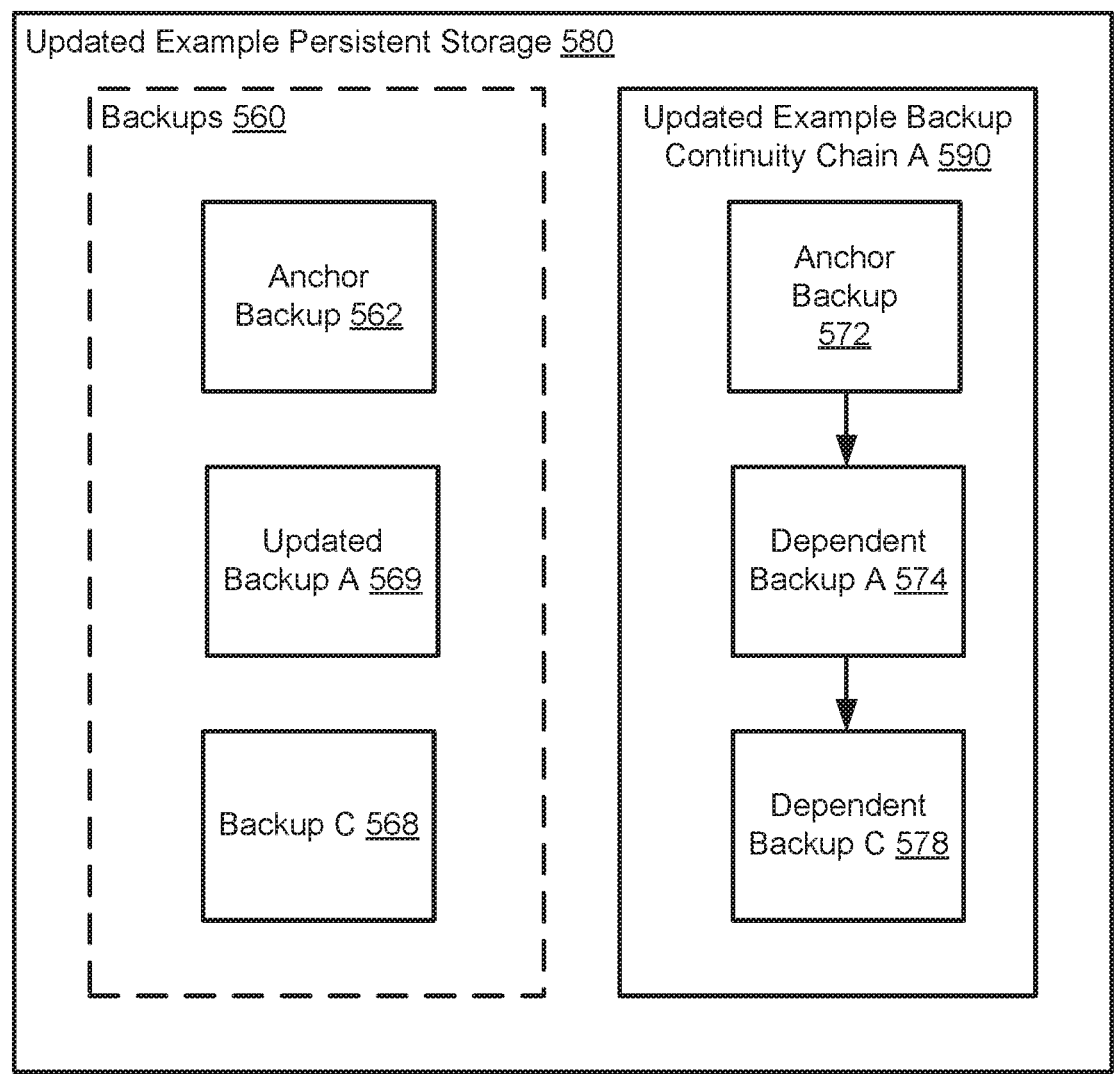
FIG. 5C shows a diagram of an updated example persistent storage.

To further clarify aspects of embodiments of the invention, a non-limiting example is provided in FIGS. 5A-5C.

Example

Consider a scenario in which a production host has obtained a backup generation request for a virtual machine. FIG. 5A shows an example virtual machine continuity chain (500) associated with the virtual machine (not shown) stored in persistent storage of a production host (not shown). The example virtual machine continuity chain (500) may include an anchor disk (502) and two dependent disks (504, 506). A dependent disk B (not shown) may have been removed from the virtual machine continuity chain at a time prior to the example virtual machine continuity chain (500). For example, it may no longer be desirable to restore a state of the virtual machine to that associated with dependent disk B.

The production host, in response to the backup generation request, may perform the methods of FIGS. 4A-4C to perform a backup of the virtual machine.

To generate a backup for the virtual machine, FIG. 5B shows an example persistent storage (550) of a backup storage (not shown). The persistent storage may include backups (560) and an example backup continuity chain (570) associated with the backups (560). Each of the backup (e.g., 562, 564, 566, 568) may store data specified by backups (e.g., 572, 574, 576, 578) of the example backup continuity chain (500, FIG. 5A) discussed above. As discussed above, the production host may obtain the example backup continuity chain (570) from the backup storage. The production host may compare it with the virtual machine continuity chain (500) and identify that the continuity chains do not match. More specifically, the example backup continuity chain (570) may specify a dependent backup B (578), and the virtual machine continuity chain (500, FIG. 5A) does not specify a dependent backup B.

To remediate the mismatch, the backup storage may be prompted to remove backup B (576) from the example backup continuity chain (570). Additionally, the backup storage may merge the data of backup B (566) with the data of backup A (564) because backup B (566) depends on backup A (564).

FIG. 5C shows an updated example persistent storage (580) with an updated example backup continuity chain (590) and an updated backup (569). The updated backup (569) may include merged data from backup B (566).

Thus, via the method illustrated in this example, data in backup storage may be placed in a state that enables smaller backups to be generated which conserves computing resources of the distributed system.

End of Example

Figure 6:
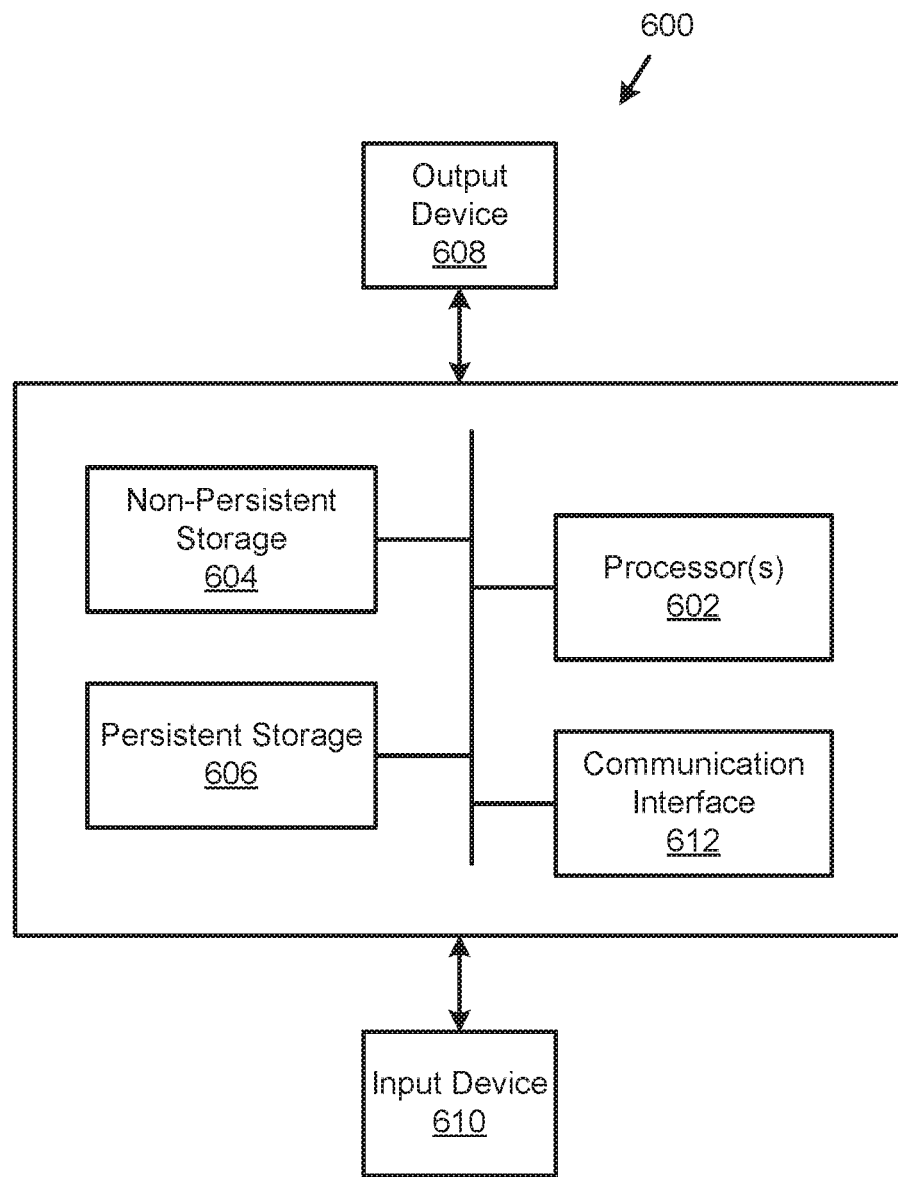
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve reliability of data stored in the distributed system. Specifically, embodiments of the invention may provide an improved method for storing of backups in backup storage. The improved method may reduce the computing resources consumed when storing backups in backup storage when compared to contemporary methods of providing backup services. For example, embodiments of the invention may enable smaller backups to be generated after previously generated backups are no longer useful for restoration purposes. Thus, embodiments of the invention improve the field of distributed systems which relies on redundancy provided by the distributed system for such technology.

Thus, embodiments of the invention may address the problem of limited computing resources in a distributed environment by improving the availability of computing resources in such environments. Because distributed systems rely on redundancy, rather than perfect operation, availability of computing resources for redundancy purposes is necessary and arises due to the nature of the technological environment which distributed systems exist.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host that hosts virtual machines, comprising:
a persistent storage that stores backup policies; and
a production agent programmed to:
obtain a backup generation request for a virtual machine of the virtual machines; and
in response to the backup generation request:
perform a continuity chain verification of a continuity chain associated with the virtual machine to identify a continuity state of backups associated with the virtual machine;
make a first determination, based on the continuity state of the backups associated with the virtual machine, that the backups associated with the virtual machine are in a remediable state; and
in response to the first determination:
perform a remediation of the continuity chain to change the backups associated with the virtual machine to be in a continuous state; and
generate a backup of the virtual machine using the backup policies while the continuity state of the backups associated with the virtual machine are in the continuous state.

2. The production host of claim 1, wherein the backups are stored in a backup storage that is separate from the production host.

3. The production host of claim 1, wherein the continuity chain verification is performed based on virtual machine continuity information stored in the persistent storage of the production host.

4. The production host of claim 1, wherein the production agent is further programmed to:
obtain a second backup generation request for a second virtual machine of the virtual machines; and
in response to the second backup generation request:
perform a second continuity chain verification of a continuity chain associated with the second virtual machine to identify a second continuity state of backups associated with the second virtual machine;
make a second determination, based on the second continuity state of the backups associated with the second virtual machine, that the backups associated with the second virtual machine are in a second continuous state; and
in response to the second determination:
generate a backup of the second virtual machine using the backup policies while the continuity state of the backups associated with the second virtual machine are in the second continuous state without performing a remediation of the second continuity chain.

5. The production host of claim 4, wherein the production agent is further programmed to:
obtain a third backup generation request for a third virtual machine of the virtual machines; and
in response to the third backup generation request:
perform a third continuity chain verification of a continuity chain associated with the third virtual machine to identify a third continuity state of backups associated with the third virtual machine;
make a third determination, based on the third continuity state of the backups associated with the third virtual machine, that the backups associated with the third virtual machine are in a non-remediable state; and
in response to the third determination:
generate an anchor backup of the third virtual machine while the backup policies specify generation of a different type of backup of the third virtual machine.

6. The production host of claim 5, wherein the different type of backup is a dependent backup.

7. The production host of claim 1, generating the backup of the virtual machine using the backup policies while the continuity state of the backups associated with the virtual machine are in the continuous state comprises:
storing the backup in a backup storage that is separate from the production host.

8. A method for performing a backup of a virtual machine, comprising:
obtaining a backup generation request for the virtual machine; and
in response to the backup generation request:
performing a continuity chain verification of a continuity chain associated with the virtual machine to identify a continuity state of backups associated with the virtual machine;
making a first determination, based on the continuity state of the backups associated with the virtual machine, that the backups associated with the virtual machine are in a remediable state; and
in response to the first determination:
performing a remediation of the continuity chain to change the backups associated with the virtual machine are to be in a continuous state; and
generating a backup of the virtual machine using backup policies of a production host hosting the virtual machine while the continuity state of the backups associated with the virtual machine are in the continuous state.

9. The method of claim 8, wherein the backups are stored in a backup storage that is separate from the production host.

10. The method of claim 8, wherein the continuity chain verification is performed based on virtual machine continuity information stored in a persistent storage of the production host.

11. The method of claim 8, wherein the method further comprises:
obtaining a second backup generation request for a second virtual machine of the virtual machines; and
in response to the second backup generation request:
performing a second continuity chain verification of a continuity chain associated with the second virtual machine to identify a second continuity state of backups associated with the second virtual machine;
making a second determination, based on the second continuity state of the backups associated with the second virtual machine, that the backups associated with the second virtual machine are in a second continuous state; and
in response to the second determination:
generating a backup of the second virtual machine using the backup policies while the continuity state of the backups associated with the second virtual machine are in the second continuous state without performing a remediation of the second continuity chain.

12. The method of claim 11, wherein the method further comprises:
  obtaining a third backup generation request for a third virtual machine of the virtual machines; and
  in response to the third backup generation request:
    performing a third continuity chain verification of a continuity chain associated with the third virtual machine to identify a third continuity state of backups associated with the third virtual machine;
    making a third determination, based on the third continuity state of the backups associated with the third virtual machine, that the backups associated with the third virtual machine are in a non-remediable state; and
    in response to the third determination:
      generating an anchor backup of the third virtual machine while the backup policies specify generation of a different type of backup of the third virtual machine.

13. The method of claim 12, wherein the different type of backup is a dependent backup.

14. The method of claim 8, generating the backup of the virtual machine using the backup policies while the continuity state of the backups associated with the virtual machine are in the continuous state comprises:
  storing the backup in a backup storage that is separate from the production host.

15. A non-transitory computer readable medium comprising computer readable program code, which when executed by a computer processor enables the computer processor to perform a method for performing a backup of a virtual machine, the method comprising:
  obtaining a backup generation request for the virtual machine; and
  in response to the backup generation request:
    performing a continuity chain verification of a continuity chain associated with the virtual machine to identify a continuity state of backups associated with the virtual machine;
    making a first determination, based on the continuity state of the backups associated with the virtual machine, that the backups associated with the virtual machine are in a remediable state; and
    in response to the first determination:
      performing a remediation of the continuity chain to change the backups associated with the virtual machine are to be in a continuous state; and
      generating a backup of the virtual machine using backup policies of a production host hosting the virtual machine while the continuity state of the backups associated with the virtual machine are in the continuous state.

16. The non-transitory computer readable medium of claim 15, wherein the backups are stored in a backup storage that is separate from the production host.

17. The non-transitory computer readable medium of claim 15, wherein the continuity chain verification is performed based on virtual machine continuity information stored in a persistent storage of the production host.

18. The non-transitory computer readable medium of claim 15, wherein the method further comprises:
  obtaining a second backup generation request for a second virtual machine of the virtual machines; and
  in response to the second backup generation request:
    performing a second continuity chain verification of a continuity chain associated with the second virtual machine to identify a second continuity state of backups associated with the second virtual machine;
    making a second determination, based on the second continuity state of the backups associated with the second virtual machine, that the backups associated with the second virtual machine are in a second continuous state; and
    in response to the second determination:
      generating a backup of the second virtual machine using the backup policies while the continuity state of the backups associated with the second virtual machine are in the second continuous state without performing a remediation of the second continuity chain.

19. The non-transitory computer readable medium of claim 18, wherein the method further comprises:
  obtaining a third backup generation request for a third virtual machine of the virtual machines; and
  in response to the third backup generation request:
    performing a third continuity chain verification of a continuity chain associated with the third virtual machine to identify a third continuity state of backups associated with the third virtual machine;
    making a third determination, based on the third continuity state of the backups associated with the third virtual machine, that the backups associated with the third virtual machine are in a non-remediable state; and
    in response to the third determination:
      generating an anchor backup of the third virtual machine while the backup policies specify generation of a different type of backup of the third virtual machine.

20. The non-transitory computer readable medium of claim 19, wherein the different type of backup is a dependent backup.

* * * * *